Patented Aug. 24, 1937

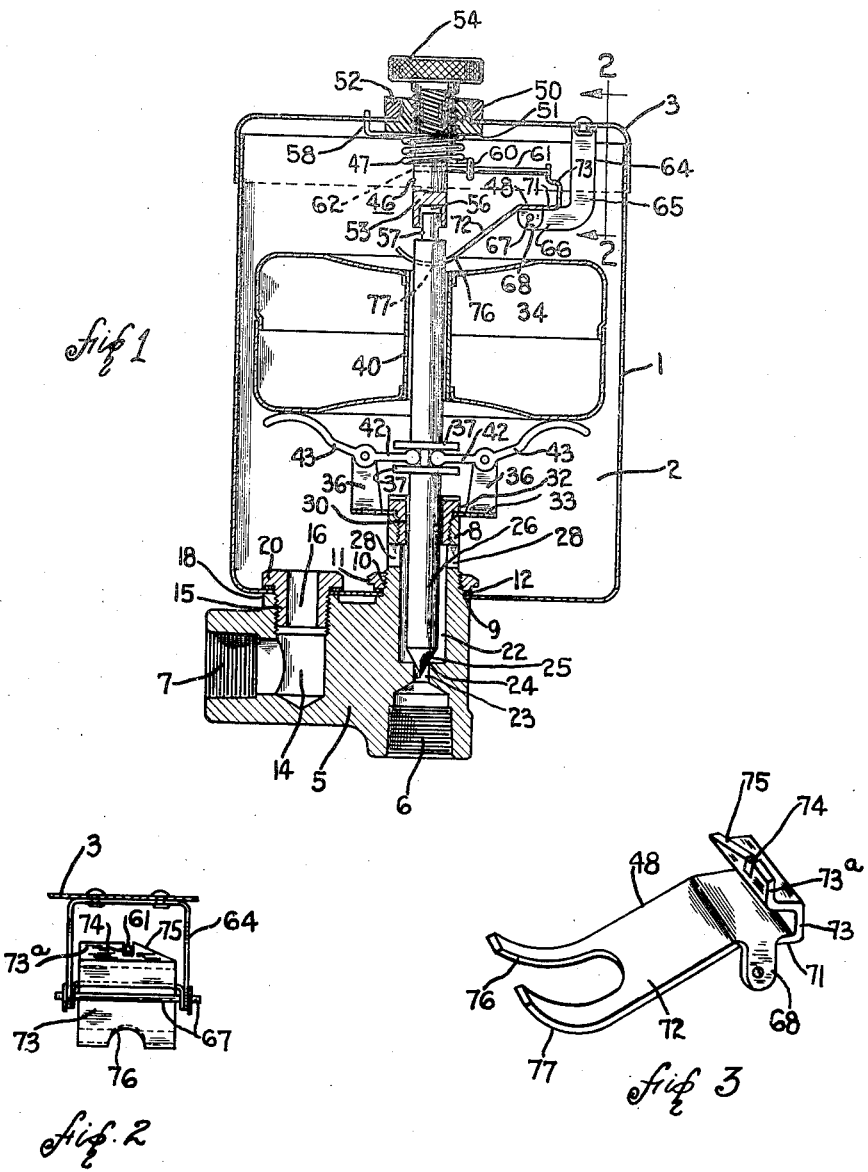

2,091,228

UNITED STATES PATENT OFFICE 2,091,228

CONTROL DEVICE

Albert G. Hann, Detroit, Mich., assignor to Detroit Lubricator Company, Detroit, Mich., a corporation of Michigan Application January 30, 1935, Serial No. 4,031

20 Claims. (Cl. 137—68)

My invention relates in general to control devices and more particularly to devices for controlling the flow of liquid.

One of the objects of my invention is to provide a float control device of the type having an auxiliary valve actuating mechanism and to provide a device of this character having a new and improved arrangement of the operating parts thereof.

Another object of my invention is to provide a new and improved control device of the type having an auxiliary valve actuating mechanism within the casing of the device and to provide a device of this character in which the auxiliary valve actuating mechanism is so arranged that it can be readily removed, as a unitary structure, with the cover of the casing, to facilitate assembly and to give ready access to the operating parts of the device upon necessity for cleaning or repairing or replacing of the parts.

A further object of the invention is to provide a control device of the above mentioned character having a new and improved arrangement of the operating parts thereof into a compact unit which is effective in operation and yet simple in construction and economical to manufacture both in regards to its parts and their assembly.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated a preferred embodiment of my invention, in which drawing—

Figure 1 is a view shown in vertical cross section of my improved control device;

Fig. 2 is a detail view taken in the direction of the arrows 2—2 of Fig. 1, and

Fig. 3 is a detail view shown in perspective of a part of the device.

Referring to the drawing by characters of reference, the numeral 1 designates in general a casing having a member 2 closed at the top by a removable closure member or cover 3. The casing 1 may be constructed of sheet metal, as shown, or cast, and be cylindrical or rectangular in shape, as desired. The removable cover 3, which may also be formed of sheet metal if desired, is preferably sleeve fitted on the top of the casing or container so as to be readily removable although, if desired, it may be secured to the casing such as by screws (not shown) or other suitable readily detachable securing means. A valve housing 5 having an inlet 6 and an outlet 7 is fixed to the bottom wall of casing 1 and has a vertically extending portion 8 extending through an aperture in the bottom wall of the casing and projecting part-way into chamber 2. The valve housing 5 is formed with an external upwardly facing offset portion or shoulder 9 for abutment against the underside of the bottom wall of the casing. To secure the valve housing 5 to the casing 1, the vertically extending portion 8 which may be cylindrical in shape is externally threaded, as at 10, for threaded engagement with a nut 11 disposed within the chamber 2 for clamping the valve housing 5 to the bottom wall of casing 1. Packing material 12 may be employed between the nut 11 and the bottom wall of the casing to insure a leak-proof connection.

A vertically extending bore 14 in communication with outlet bore 7 is internally threaded to receive an externally threaded tubular member 15, which member has a central bore 16 therethrough providing communication between the chamber 5 and bore 14. Surrounding the upper end of bore 14 is an upwardly extending portion or boss 18, the upper face of which engages the underside of the bottom wall of the casing and is clamped thereto by the tubular screw member 15. The tubular screw member 15 is provided with a head 20 and between the head 20 and the inner bottom wall, packing material may be employed to insure a leak-proof connection.

A vertically extending bore 22 extends centrally through the vertically extending portion 8 and through the top thereof and is in communication with the inlet bore 6 through a relatively small bore 23 concentric therewith. The bore 22 and the bore 23 cooperate to provide an upwardly facing seat 24 for cooperation with the conical face 25 of a valve 26. The valve 26 has a stem portion extending vertically through bore 22 and through the top of the tubular member 8 to a point preferably adjacent the top of the chamber 2. Laterally extending bores 28 in the vertically extending portion 8 within the casing provide communication between bore 22 and the chamber 2 of the casing. The upper end of the vertically extending portion 8 is internally threaded to receive an externally threaded tubular member or guide 30 for the valve 26. Between the head 32 of the tubular member 30 and the upper end of the vertically extending portion 8 is clamped the base 33 of a toggle device for actuating the valve 26.

Within the chamber 5 and above the toggle device is a float 34 for actuating the valve 26 through operation of the toggle device to maintain a substantially constant liquid level in chamber 5. As shown, the float 34 surrounds the valve stem and may be constructed in sections of sheet metal if desired. The float is provided with a vertically extending sleeve 40 centrally thereof through which the valve stem extends, the inner diameter of the sleeve preferably being slightly larger than the diameter of the valve stem 26 so that the float can move independently of and without interference with the valve stem.

The toggle device includes the usual oppositely disposed pivoted levers having relatively short arms 42 engaging the valve and the relatively long arms 43 for engagement with the underside of the float 34. Preferably, the arms 43 of the toggle device have rounded or convex upper surfaces at the outer end portions for reducing friction between the arms and the float 34. The toggle levers are pivotally supported on oppositely disposed upright members 36 which extend upwardly from the base 33. The valve stem is provided with spaced horizontally disposed flanges 37 between which the short arms 42 of the toggle device extend and these arms 42 may be bifurcated at the ends to receive the valve stem.

Disposed above the float 34 in chamber 2 and carried by the removable cover 3 is a second or auxiliary valve actuating mechanism. The second valve actuating mechanism is normally inactive during normal operation of the device but is operable for closing the inlet valve port should the float 34 fail to do so for any reason, such as, for example because of grease or other foreign matter which might collect between the valve and the seat and prevent proper seating of the valve. The second valve actuating means comprises in general, an actuator 46 or force transmitting member, an actuating means in the form of a coil spring 47, and a rock lever latch or trip member 48. The cover 3 is provided with an aperture centrally thereof for receiving the shank of a tubular member 50 which has a head 51 providing a shoulder for bearing against the underside of the cover 3. The upwardly extending shank of the tubular member 50 is externally threaded for threaded engagement with a nut 52 for clamping the tubular member to the cover. Preferably the tubular member 50 is in axial alignment or concentric with the valve stem and is internally threaded for receiving the actuator 46 which has a threaded portion at its upper end for threaded engagement with the member 50.

The actuator 46 includes a shank portion 53 preferably having a bore recess 56 in the lower end for receiving the reduced upper end portion 57 of the valve stem to serve as a guide for the same. The upper end of the actuator 46 is provided with a thumb screw 54 externally of the casing for manually rotating the actuator 46. Preferably the internal thread provided on the member 50 and the cooperating thread provided on the shank of the actuator 46 are so-called double or triple threads so as to obtain a corresponding lead or lineal movement of the actuator upon rotation of the same and also to reduce friction therebetween so that the actuator may be easily rotated. The coil spring 47 which surrounds the shank of the actuator 46 has its upper end 58 fixed in an aperture in the cover 3. The other end of the coil spring 47 is curled to provide an eyelet 60 for receiving a pin 61 which extends through the eyelet 60 and is fixed at one end in a laterally extending aperture or bore 62 in the valve stem.

Depending from the underside of the cover 3 and fixed thereto such as by rivets or other suitable means is a U-shaped bracket 64, the substantially parallel sides 65 of which have horizontally extending portions 66 at the lower ends thereof extending toward the actuator 46. In the ends of the horizontal portions 66 are provided vertically aligned apertures for receiving a horizontally extending bearing pin 67. Pivotally mounted on the bearing pin 67 is the rock lever latch member 48 having the downwardly extending oppositely disposed flange members 68 provided with aligned apertures for receiving the bearing pin 67. The rock lever 48 is preferably pivotally supported between its ends and at a point so as to provide a relatively short lever arm 71 and a relatively long arm 72. The lever arm 71 preferably has an upwardly extending portion 73 having an offset portion 73ª which extends toward the valve stem and which is offset for a purpose which is hereafter explained. In the top edge of the offset portion 73ª is preferably provided a notch 74 intermediate the side edges for receiving and normally retaining the end portion of the pin 61. Preferably only the extreme end portion of the pin 61 is arranged in the notch 74 so that the pin will be quickly released when the rock lever 48 is pivoted in a clockwise direction, as seen on the drawing. The upper edge of the vertically extending portion 73ª of the rock arm 48 is tapered from the notch 74 downwardly to one edge of the rock lever providing an inclined edge or cam 75 to facilitate the positioning of the pin 61 in the notch 74. The relatively long lever arm 72 extends downwardly from the pivot point and toward the valve stem and is provided with a slot 76 in its lower end for clearing the valve stem. Preferably the lower end portion of arm 72 which engages the upper surface of the float 34 is rounded, as at 77, providing a convex surface to reduce friction between the float and the arm.

Ready access may be had to the auxiliary valve actuating mechanism and to the other mechanism within chamber 2 by reason of the ready removability of the auxiliary valve actuating mechanism as a unitary structure with the cover 3. However, to set the auxiliary valve actuating mechanism in operative position, it is not necessary to remove the cover. After the actuator 46 is released, the pin 61 rotates with the actuator and moves downwardly, the latch 48 having been pivoted by the float 34 so that the offset portion 73ª is moved out of the path of rotation of the pin. The pin comes to rest in a plane below the offset portion in the latch member 48 and as the liquid level decreases in chamber 2 and the float 34 descends, the latch returns to its normal position by the weight of the longer lever arm 72. To reset the auxiliary valve actuating mechanism, the valve actuator 46 is rotated in a clockwise direction, as seen from the top of the device, by means of the thumb screw 54. The offset portion in the latch member provides clearance for the pin and the pin rises with the actuator upon rotating the same in a clockwise direction and engages the cam or inclined top edge 75 of the latch 48. Upon further rotation the pin 61 climbs the inclined cam face 75 and is put under a slight tension so that when it reaches the slot 74 it snaps thereinto. Rotating the actuator 46 clockwise moves it upward and away from the valve stem and also at the same time winds the spring close about the actuator, storing in the spring a potential force tending to unwind and rotate the actuator in the opposite direction and downwardly against the top of the valve stem.

A complete operation of the device is as follows: The device is adapted to maintain a predetermined constant liquid level in chamber 2 to maintain the flow of liquid by gravity from outlet port 7 substantially constant. When the liquid level decreases below the predetermined constant level, the float 34 descends in the chamber 2 and by its weight on the pivoted lever arm 43 of the toggle device raises the valve 26 away from its seat to permit entrance of liquid to the chamber. When the liquid level reaches the substantially constant level, the float 34, which is movable independently of the valve, rises to permit the valve by reason of its own weight to seat and close the inlet port. If for some reason the valve 26 would not seat, for example, if grease or other foreign matter collected between the valve and its seat and prevented the proper seating of the valve, then liquid would continue to enter chamber 2 and rising above the constant liquid level would cause the float 34 to also rise in the chamber. After the float 34 rises to a certain point, it engages the arm 72 of the rock lever 48 and continuing to rise, pivots the lever, moving the arm 71 out of engagement with the pin 61, thus releasing the same. Upon unlatching the pin 61, the stored energy or potential force of the coil spring 47 is released, the spring then unwinding and rotating the actuator 48 in a counter-clockwise direction. As the actuator is rotated in a counter-clockwise direction, it moves downwardly into engagement with the upper end of the valve stem 26 and moves the valve to closed position. A suitably strong spring may be employed so that it will have sufficient force when released to crush out grime or other foreign matter from the valve seat and thus properly seat the valve.

From the foregoing description, it will now be appreciated that I have provided a control device having a new and improved arrangement of the operating parts thereof. By means of the new and improved arrangement of the operating parts, it will be seen that I have provided an efficiently operating device and yet one which is simple in operation and economical to manufacture. It will also be seen that by having the auxiliary valve actuating mechanism removable with the cover as a unitary structure, ready access may be had to the mechanism for cleaning or replacing parts thereof.

What I claim and desire to secure by Letters Patent of the United States is:

1. In a control device, a casing having a chamber for liquid and a valve port therefor, a valve for controlling said port and having a stem portion extending vertically therefrom, a float surrounding said valve stem within the chamber and operable in response to changes in the liquid level for controlling the valve to maintain a substantially constant level in the chamber, a second valve actuating means disposed in said chamber immediately above said valve stem, and float actuated means normally restraining said second-named actuating means and operable by said float to release said second-named actuating means when the liquid level rises above said substantially constant level.

2. In a control device, a casing having a chamber for liquid and an opening in a wall thereof, a valve port for said chamber, removable closure means for closing said opening, a valve controlling said port, means responsive to changes in liquid level in said chamber for actuating said valve to maintain the liquid level in said chamber substantially constant, means operatively connecting said valve and said responsive means, an auxiliary valve actuator, auxiliary actuated means controlling operation of said auxiliary actuator, said auxiliary actuator being operable to move said valve to close said port when said auxiliary actuated means is actuated, said auxiliary actuator and said auxiliary actuated means being carried by and removable with said removable closure means as a unitary structure, said actuated means being actuated by said responsive means upon a predetermined increase in the liquid level in said chamber above said substantially constant level.

3. In a control device, a casing having a chamber for liquid and a valve port therefor, a valve for controlling said port and having a stem portion extending vertically therefrom, a tubular member surrounding said valve stem and extending part-way into the chamber, a toggle device for actuating said valve and having a base mounted on said tubular member, means for clamping the base to said member, and a float within the chamber for actuating said toggle device to maintain a substantially constant liquid level in said chamber.

4. In a control device, a casing having a chamber for liquid and a valve port therefor, a valve for controlling said port and having a stem portion extending vertically therefrom, a float responsive to changes in the liquid level in said chamber for actuating the valve to maintain a substantially constant liquid level, said float having an aperture for receiving said valve stem, a second and normally inactive valve actuating means disposed above the upper end of said valve stem operable for engaging said valve stem and closing the valve port, and means normally restraining said second-named valve actuating means and operable by the float when the liquid level rises above said constant level to release said second valve actuating means.

5. In a control device, a casing having a chamber for liquid and a valve port therefor, a valve for controlling said port, a toggle device within said chamber operable for actuating said valve, a lineally movable float surrounding said valve stem and disposed immediately above and substantially in vertical alignment with said toggle device, said float being movable independently of the valve and operable in response to changes in liquid level to actuate said toggle device, and a second valve actuating means disposed immediately above and substantially in vertical alignment with said float, said actuating means being operable by said float when the level of the liquid rises above the constant level for moving said valve to close said port.

6. In a control device, a casing having a chamber for liquid and a valve port therefor, a single valve for controlling said port, a valve actuating means adjacent the bottom of the chamber for actuating said valve, a second valve actuating means adjacent the top of the chamber for actuating said valve, and a float between said valve actuating means surrounding said valve stem and movable independently of said valve in response to changes in the liquid level to control the operation of both of said valve actuating means.

7. In a device of the character described, a casing having a chamber for liquid and a valve port therefor, a valve for controlling said port and having a vertically extending stem portion, a float in said chamber for controlling the operation of said valve to maintain a predetermined substantially constant liquid level in said chamber, a valve actuator normally inactive and operable when moved to actuate said valve to closed position, a tension spring normally under tension and having a force stored therein acting to actuate said actuator, and a latch member normally maintaining said spring under tension and operable by said float when the level of the liquid rises above said substantially constant level for releasing said spring.

8. In a control device having a chamber for liquid and a valve control mechanism for controlling an inlet port to maintain a substantially constant liquid level in the chamber, an auxiliary valve actuating mechanism for moving the valve to closed position when the level of the liquid rises above said substantially constant level comprising a rotatable and lineally movable actuator arranged for engaging the valve to move the valve to closed position, said actuator being normally inactive, a coil spring surrounding said actuator and normally wound therearound under tension and having a force stored therein acting to rotate and lineally move the actuator to close the valve, and a pivotal latch member normally maintaining said spring under tension and operable by said valve control mechanism when the level of the liquid rises above said substantially constant level for releasing said spring.

9. In a control device having a casing and a valve control mechanism for controlling an inlet port to maintain a substantially constant liquid level in a chamber in the casing, an auxiliary valve actuating mechanism operable when the liquid level rises above said constant level to move the valve to closed position comprising a normally inactive actuator arranged for engaging the valve to move the same to closed position, resilient means normally under tension and acting to move the actuator, and a latch member normally maintaining said resilient means under tension and operable by said valve control mechanism when the level of the liquid rises above said constant level for releasing said resilient means, said actuator having a portion thereof extending exteriorly of the casing for manually resetting said auxiliary valve actuating mechanism in its normal inactive position.

10. In a liquid level control device having a chamber for liquid and a float actuated valve for controlling an inlet port to maintain a substantially constant liquid level in said chamber, an auxiliary valve actuating mechanism for moving the valve to closed position when the level of the liquid rises above said substantially constant level comprising a force transmitting means normally disposed out of engagement with said valve and operable for engaging and moving said valve to close said port, means exerting a force acting to move said force transmitting means, and a latch member normally restraining said last-named means and operable by said float for releasing said last-named means upon predetermined liquid level increase above said substantially constant level.

11. In a liquid level control device having a chamber for liquid and a float actuated valve for controlling an inlet port to maintain a substantially constant liquid level in said chamber, an auxiliary valve actuating mechanism for moving the valve to closed position when the level of the liquid rises above said substantially constant level comprising a force transmitting means normally disposed out of engagement with said valve and operable for engaging and moving said valve to close said port, means exerting a force acting to move said force transmitting means, and a latch member pivoted in said chamber above said float and with one end portion extending over said float in spaced relation thereto, said latch member normally engaging and restraining said last-named means and being pivoted by said float for releasing said last-named means.

12. In a liquid level control device having a chamber for liquid and a float actuated valve for controlling an inlet port to maintain a substantially constant liquid level in said chamber, an auxiliary valve actuating mechanism for moving the valve to closed position when the level of the liquid rises above said substantially constant level comprising a force transmitting means normally disposed out of engagement with said valve and operable for engaging and moving said valve to close said port, a spring normally under tension and acting to move said force transmitting means, a latch member normally holding said spring under tension and operable by said float for releasing said spring, and manually operable means projecting exteriorly of said casing and operable for positioning said spring under tension in inactive position.

13. In a liquid level control device, a casing having a chamber for liquid and a valve port therefor, a reciprocal valve for controlling said port, wall means surrounding said valve member and projecting into said chamber, a float in said chamber for actuating said valve to maintain a substantially constant liquid level in said chamber, a toggle device operatively connecting said float and said valve and having a base portion mounted on said wall means, and a tubular member surrounding and guiding said valve and securing said base portion to said wall means.

14. A liquid level control device comprising a hollow sheet metal casing defining a reservoir and having a bottom wall provided with an aperture therethrough, a body portion associated with said casing and having an inlet for liquid, said body having a tubular wall portion in communication with said inlet and projecting through said aperture into said reservoir, said tubular wall portion defining a valve chamber, a reciprocal valve member disposed in said chamber and controlling said port, said valve member extending upwardly into said reservoir, a float member disposed in said reservoir and surrounding said valve stem, said float being movable relative to said valve member, a toggle device carried by said tubular wall portion and disposed beneath said float, said toggle device having operative connection with said valve member and operable by said float to actuate said valve member to maintain a substantially constant liquid level in said reservoir, and an auxiliary valve actuating means disposed within said reservoir above said float and operable by said float to move said valve member to closed position upon failure of said float to maintain said substantially constant level.

15. In a device of the character described, a casing having a chamber for liquid and a valve port therefor, a valve for controlling said port, a float operable in response to changes in liquid level in said chamber for controlling the operation of said valve to maintain a predetermined substantially constant liquid level in said chamber, a valve actuator operable to actuate said valve to closed position, resilient means normally having a force stored therein to actuate said actuator, and a latch member operable by said float upon a predetermined liquid level rise above said substantially constant liquid level for releasing the force stored in said resilient means.

16. In a control device having a casing containing a chamber and a valve port therefor and having an opening in a wall of said casing, a removable closure member for closing said opening, a valve for controlling flow through said port, means operable in response to changes in the liquid level in said chamber for actuating said valve to maintain the liquid level in the chamber substantially constant, and an auxiliary valve actuating mechanism carried by and removable with said closure member as a unitary structure, said auxiliary valve actuating means being controlled by said first-named valve actuating means and operable to close said valve upon failure of said first-named valve actuating means to maintain said substantially constant level.

17. In a control device having a casing containing a chamber and a valve port therefor and having an opening in a wall of said casing, a removable closure member for closing said opening, a valve for controlling flow through said port, means operable in response to changes in the liquid level in said chamber for actuating said valve to maintain the liquid level in the chamber substantially constant, a normally inactive valve actuating means carried by and removable with said closure member as a unitary structure, said second-named actuating means being operable to actuate said valve and close said port upon a predetermined liquid level increase above said substantially constant level, and means controlling the operation of said second-named valve actuating means and operable by said first-named valve actuating means.

18. In a control device having a casing containing a chamber and a valve port therefor and having an opening in a wall of said casing, a removable closure member for closing said opening, a valve for controlling flow through said port, means operable in response to changes in the liquid level in said chamber for actuating said valve to maintain the liquid level in the chamber substantially constant, a second valve actuating means, said second-named valve actuating means being carried by said closure member and being operable to move said valve to closed position, and means carried by said closure member for controlling the operation of said second-named actuating means and operable by said first-named valve actuating means.

19. In a control device having a casing containing a chamber and a valve port therefor and having an opening in a wall of said casing, a removable closure member for closing said opening, a valve for controlling flow through said port, means operable in response to changes in the liquid level in said chamber for actuating said valve to maintain the liquid level in the chamber substantially constant, a second valve actuating means, said second valve actuating means being carried by said closure member and having active and inactive positions, means carried by said closure member for controlling the operation of said second-named valve actuating means and operable by said first-named valve actuating means, and manually operable means carried by said closure member and operable to position said second-named valve actuating means in its inactive position.

20. In a liquid level control device, a casing having a chamber for liquid and a valve port therefor and having a top wall provided with an opening therethrough, a removable closure member for closing said opening, a valve member for controlling said port, means for actuating said valve member to maintain a substantially constant liquid level in said chamber, a second valve actuating means and carried by and removable with said closure member as a unitary structure, said second-named valve actuating means comprising a normally inactive actuator depending from said closure member and overlying said valve member in spaced relation thereto, means exerting a force acting to move said actuator to engage and move said valve to closed position and carried by said closure member, and means normally restraining said force-exerting means and carried by said closure member, said restraining means being actuated by said first-named valve actuating means to release said force-exerting means upon failure of said first-named valve actuating means to maintain said substantially constant liquid level.

ALBERT G. HANN.